Figure 1:
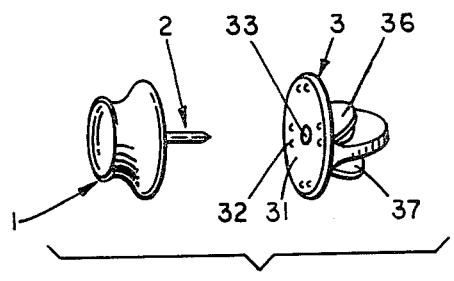

May 7, 1963  M. V. T. HAINES  3,088,295

FASTENER ADAPTER

Filed June 8, 1962

INVENTOR.
MERVYN V. T. HAINES
BY Arthur Jacob
HIS ATTORNEY 3,088,295
FASTENER ADAPTER
Mervyn V. T. Haines, 28 Glannon Road, Livingston, N.J.
Filed June 8, 1962, Ser. No. 201,144
1 Claim. (Cl. 63—20)

The present invention relates generally to an adapter for fasteners. More specifically, the invention is concerned with an adapter for attaching an ornament which has one element of a fastener device fixed therein to an article of wearing apparel or an apparel accessory without permanently fixing a mating element of the fastener device to the apparel or accessory.

Numerous detachable ornaments are being made available for use in conjunction with wearing apparel such as dresses, coats, shoes, hats, bathing suits and bathing caps and with apparel accessories such as hand bags and the like. The adapter of the invention has been devised to increase the versatility of such detachable ornaments by permitting a variety of uses for these ornaments without alteration of their basic structure.

A primary object of the invention is to provide simplified means for attaching an ornament having one element of a fastener device fixed therein to an article of wearing apparel or an apparel accessory without permanently fixing a mating element of the fastener device to the apparel or accessory.

Another object of the invention is to allow standardization of detachable ornament fastening means without limiting the uses of such ornaments.

The invention may briefly be described as a fastener adapter for use in mounting one of a variety of ornaments upon one of a variety of supporting structures, each ornament having a first element of a fastener device fixed therein, the adapter comprising a mating element of the fastener device and means cooperating with said mating element for selectively removably maintaining the mating element upon the supporting structure independent of the first element.

Figure 2:
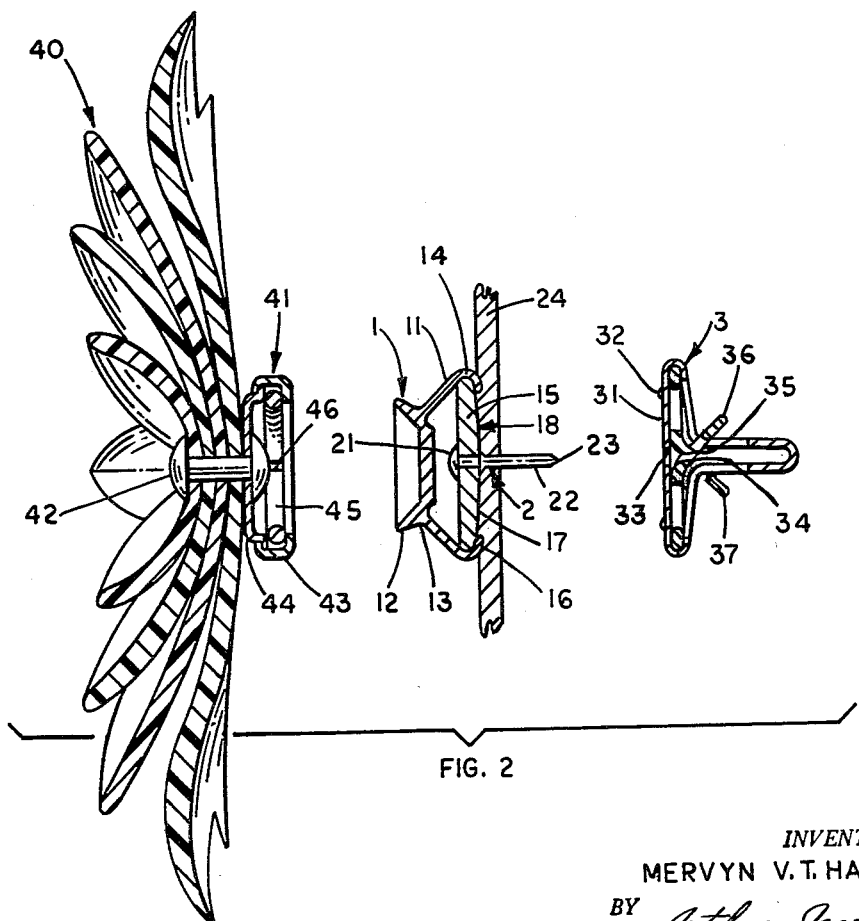

The novel features of the invention, as well as additional objects and advantages thereof, will be more fully understood from the following detailed description of an embodiment of the invention illustrated in the drawings in which:

FIGURE 1 is a perspective view showing elements of an adapter constructed in accordance with the invention; and FIGURE 2 is an elevational cross-sectional view illustrating the use of an adapter of FIGURE 1 in mounting an ornament.

Referring first to FIGURE 1, an adapter of the invention is shown comprising an element 1, which is an element of a fastener device, a pin 2 and a gripper 3. In the embodiment illustrated the fastener element 1 is a male element of a snap fastener.

As shown in detail in FIGURE 2, shell 11 of fastener element 1 is shaped so as to form a flange 12 and a recess 13 designed to engage a mating element of a fastener device which, in the embodiment illustrated, would be a female element of a snap fastener. A small lip 14 formed integral with shell 11 holds disc 15 firmly in place in the shell. The outer surface 16 of lip 14 and the outer surface 17 of the disc form a clamping surface 18. Pin 2 is fixed in disc 15 at head 21 and projects in a direction substantially perpendicular to clamping surface 18. The body 22 of the pin ends in a point 23 which is provided for piercing the material of a supporting structure 24. The supporting structure may be the body of an item of wearing apparel, an apparel accessory or any item upon which an ornament is to be mounted.

Gripper 3 is provided with a clamping surface 31 having protrusions 32 thereon for enhancing the gripping qualities of the clamping surface. An aperture 33 is provided for receiving pin 2.

In mounting the illustrated adapter upon a chosen item, pin 2 is made to pierce the material of the item and clamping surface 18 is brought into contact with the material of the supporting structure 24 as shown in FIGURE 2. Pin 2 is then inserted into the aperture 33 of gripper 3 and the gripper is moved along the body of the pin until clamping surface 31 contacts structure 24. Jaws 34 and 35 will resiliently grip body 22 of the pin thereby tending to prevent the gripper from slipping relative to the pin 2, particularly in a direction along the body 22 of the pin toward the point 23 (toward the right in FIGURE 2). Thus, the clamping surfaces 18 and 31 cooperate with pin 2 to clamp the material of supporting structure 24 between the clamping surfaces and hold the fastener element 1 firmly in place upon supporting structure 24. It is noted that the jaws 34 and 35 will grip pin 2 at any desired position along the body 22 of the pin so that supporting structures of various thicknesses are accommodated readily. When it is desired to remove fastener element 1 from supporting structure 24, lever 36, which is integral with jaw 34, and lever 37, which is integral with jaw 35, are moved in a direction toward one another thereby causing the jaws to spread apart and release pin 2. Gripper 3 may then be released from engagement with pin 2 and fastener element 1 may be removed from supporting structure 24. The release of gripper 3 and the removal of fastener element 1 from the supporting structure is thus readily accomplished manually at the selection of the user of the adapter.

A snap-on ornament 40, which is illustrated in FIGURE 2 in the form of a plastic flower, is shown mounted upon a mating element 41 of a fastener device by means of a rivet 42. In the embodiment illustrated, element 41 is a female element of a snap fastener. Rim 43 cooperates with head 44 to maintain retainer 45 in place. Retainer 45 is a bronze ring with a split 46 which will allow the ring to expand radially to pass over flange 12 and then anchor itself in recess 13 to hold the ornament 40 in place upon supporting structure 24 when fastener element 1 is held in place upon the supporting structure by the cooperation of pin 2 and gripper 3.

It will be readily apparent that the adapter illustrated and described above will allow anyone of a variety of existing snap-on ornaments to be employed with a wide variety of items where it may be undesirable to permanently affix a mating element of a snap fastener to such items.

The above description of an embodiment of the invention is provided by way of example only and is not intended to restrict the invention. Changes may be made in various details of design and construction without departing from the spirit and scope of the invention as defined in the appended claims.

I claim:
A fastener adapter for use in mounting one of a variety of ornaments upon one of a variety of supporting structures, each structure being readily capable of being pierced, said fastener adapter comprising:
(A) a fastener having a first element permanently fixed to the ornament, said element having a radially expansible retainer member located therein;
(B) a mating element of said fastener, said mating element comprising a shell having first and second opposed ends;
(C) a flange in said shell adjacent said first end;
(D) said shell having a recess adjacent said flange, said retainer member being detachably secured within said recess when said first element is in place on said mating element, said flange cooperating with said retainer member to releasably maintain said retainer within said recess;
(E) a lip integral with said second end of said shell;
(F) a disc located within said shell and permanently fixed therein at said second end, said lip being formed over said disc to retain said disc in place within said shell, said disc and said lip comprising a first clamping surface;
(G) a pin projecting from said disc to pierce said supporting structure when said mating element is mounted upon said supporting structure; and
(H) a gripper having a second clamping surface, said gripper being removably engageable with said pin such that said first and second clamping surfaces may be selectively moved toward and away from each other to removably clamp said supporting structure between said clamping surfaces and removably mount said mating element upon said supporting structure.

References Cited in the file of this patent

UNITED STATES PATENTS

| | | |
|---|---|---|
| 2,193,605 | Thor | Mar. 12, 1940 |
| 2,308,412 | Ballou et al. | Jan. 12, 1943 |
| 2,796,650 | Van Buren | June 25, 1957 |

FOREIGN PATENTS

| | | |
|---|---|---|
| 804,729 | Germany | Apr. 30, 1951 |